(12) United States Patent
Ramamurthy

(10) Patent No.: US 6,189,082 B1
(45) Date of Patent: Feb. 13, 2001

(54) BURST ACCESS OF REGISTERS AT NON-CONSECUTIVE ADDRESSES USING A MAPPING CONTROL WORD

(75) Inventor: Sriram Ramamurthy, San Jose, CA (US)

(73) Assignee: NeoMagic Corp., Santa Clara, CA (US)

( * ) Notice: Under 35 U.S.C. 154(b), the term of this patent shall be extended for 0 days.

(21) Appl. No.: 09/240,724

(22) Filed: Jan. 29, 1999

(51) Int. Cl.[7] .................................................. G06F 13/00
(52) U.S. Cl. ........................... 711/202; 711/170; 711/217
(58) Field of Search ................................... 711/170, 202, 711/167; 345/521, 522; 365/194; 710/28

(56) References Cited

U.S. PATENT DOCUMENTS

| | | | |
|---|---|---|---|
| 4,370,712 | 1/1983 | Johnson et al. ....................... | 364/200 |
| 5,146,572 | 9/1992 | Bailey et al. ......................... | 395/425 |
| 5,212,795 | * 5/1993 | Hendry ................................... | 710/28 |
| 5,255,378 | 10/1993 | Crawford et al. ..................... | 395/325 |
| 5,291,586 | 3/1994 | Jen et al. ............................... | 395/500 |
| 5,345,573 | 9/1994 | Bowden, III et al. ................. | 395/400 |
| 5,488,694 | 1/1996 | McKee et al. ......................... | 395/824 |
| 5,623,638 | * 4/1997 | Andrade ................................. | 711/167 |
| 5,678,037 | 10/1997 | Osugi et al. ........................... | 395/525 |
| 5,758,191 | 5/1998 | Kasebayashi et al. ................ | 395/876 |
| 5,825,711 | 10/1998 | Manning .......................... | 365/230.03 |
| 5,835,965 | 11/1998 | Taylor et al. .......................... | 711/211 |
| 5,909,701 | * 6/1999 | Jeddeloh ................................ | 711/167 |
| 6,028,613 | * 2/2000 | Larson .................................. | 345/522 |
| 6,101,136 | * 8/2000 | Mochida ............................... | 365/194 |
| 6,104,417 | * 8/2000 | Nielsen et al. ........................ | 345/521 |

* cited by examiner

Primary Examiner—John W. Cabeca
Assistant Examiner—Fred F. Tzeng
(74) Attorney, Agent, or Firm—Stuart T. Auvinen

(57) ABSTRACT

A controller chip has programmable registers that control the operation of the controller chip. The controller chip connects to a microprocessor and bus controller through a bus that performs burst cycles. Although only one address (the starting address) is sent over the bus during the burst cycle, multiple data words are sent in the burst. These data words are written to addresses that follow the starting address in a fixed burst sequence. Programmable registers are accessed in an order that is not the fixed burst sequence. The programmable registers are accessed in a non-sequential order in a single burst cycle by using a mapping control word. The starting address is is set to the address of a mapping control register in the controller chip. The mapping control word is sent as the first data word after the starting address. The mapping control word is decoded to determine which of the programmable registers are to be written during the burst cycle. The following data words in the burst are written to the programmable registers identified by the mapping control word, ignoring the addresses implied by the normal burst sequence. A single burst cycle using the mapping control word can write different programmable registers that normally could not be written together in the same burst cycle.

20 Claims, 5 Drawing Sheets

BURST ACCESS OF REGISTERS AT NON-CONSECUTIVE ADDRESSES USING A MAPPING CONTROL WORD

FIELD OF THE INVENTION

This invention relates to computer systems, and more particularly to addressing methods for programmable registers in computer chips.

BACKGROUND OF THE INVENTION

Personal computers (PCs) and other computer systems have a variety of controller integrated circuits (ICs) or chips. These controller chips control subsystems such as for graphics, the keyboard, hard, floppy, and optical disks, and general system logic such as memory bus. Controller chips are continually being improved to increase the performance and feature sets of computer subsystems.

Controller chips are usually programmable. For example, the graphics controller can be programmed with the display resolution, such as the number of pixels in a horizontal line, or the number of lines on a screen. Memory-controller chips can be programmed with numbers of clock cycles for memory accesses, so that the timing signals generated by the controller chip can be adjusted for faster memory chips or faster bus clocks.

When the computer is initialized or booted, lower-level software such as the BIOS or graphics drivers can program the controller chips by writing values into programmable registers on the controller chips. Users or higher-level programs can adjust features such as resolutions by writing different values to these registers. For example, a video game can change the resolution and color depth by writing to resolution registers in the graphics controller chip when the game program is started.

The microprocessor's address space is typically partitioned into memory and input/output (I/O) address spaces. While a large memory address space such as 4 GigaBytes (32 address bits) is provided, the I/O address space is typically much smaller, perhaps only 64 Kbytes (16 address bits). I/O addresses are used for accessing peripheral devices such as I/O ports, disk drives, modems, mouse and keyboard, and the controller chips. Often certain ranges of I/O addresses are reserved for certain types of peripherals, such as graphics, disks, and parallel ports. Thus the number of I/O addresses available to a peripheral controller chips is often limited.

Some of the programmable registers may be assigned addresses in the memory space rather than the I/O space. Since memory accesses are often faster than I/O accesses, memory-mapped registers can be accessed more quickly, improving performance. Frequently-accessed registers are often memory-mapped rather than I/O.

Programmable Registers—FIGS. 1, 2

FIG. 1 shows a computer system with a controller chip having programmable registers. A central processing unit (CPU) 12 is a microprocessor that executes instructions in a program stored in memory 14 or in a BIOS ROM (not shown). Display 16 is controlled by graphics controller 10. Programs executing on CPU 12 can update the information shown on display 16 by writing to a frame buffer inside or controlled by graphics controller 10. Graphics controller 10 reads lines of pixels from the frame buffer and transfers them to display 16, which can be a cathode-ray tube (CRT) monitor or a flat-panel display.

Bus 11 connects CPU 12 and graphics controller 10, and includes an address bus and a data bus. Bus 11 may be divided into separate sections by buffer chips. Often a high-speed bus such as a PCI (Peripheral Component Interconnect) or AGP (Accelerated Graphics Port) bus is used to connect to graphics controller 10.

Graphics controller 10 includes programmable registers 20 that control various features. For example, power-saving modes, display characteristics, timing, and shading can be controlled by CPU 12 writing to programmable registers 20. Registers are frequently written during 3D rendering or bitblt operations.

FIG. 2 highlights an address decoder that selects a data register for access. A shared address/data bus is used where the address is output during a first bus cycle while the data is output during a second bus cycle. During a first bus cycle, the CPU outputs an address on the bus to decoder 32. This address is decoded by decoder 32, causing selector 34 to selects one of the registers in programmable register 20 for access. The other programmable registers are deselected and cannot be accessed until a new address is written to decoder 32.

In the second bus cycle, the CPU writes a data value to the bus. The data written by the CPU is written through selector 34 to the register in programmable registers 20 that was selected by the address in decoder 32. The CPU may also read the selected register rather than write the selected register since selector 34 provides a bi-directional data path, depending on the read/write control signal from the CPU. For the PCI bus, address decoding takes 1, 2, or 3 clock cycles and data is written on the fourth clock cycle. A two-cycle idle time is necessary. Thus each PCI bus transaction requires 6 clock cycles.

The values written to programmable registers 20 are used to control features of the controller chip. For example, programmable registers 20 can output a number of pixels per horizontal line, and a number of lines in a screen, to counters 38 in a graphics controller. When the number of pixels written to the display matches the value of pixels/line from programmable registers 20, then a horizontal sync HSYNC pulse is generated. When the number of lines counted matches the total number of lines from programmable registers 20, then the vertical sync VSYNC is generated. Controls for windows within a screen can likewise come from programmable registers 20, such as for a movie window as described in "Transparent Blocking of CRT Refresh Fetches During Video Overlay Using Dummy Fetches", U.S. Pat. No. 5,754,170 by Ranganathan et al., and assigned to NeoMagic Corp.

FIG. 3 shows standard bus cycles to program registers. During the first bus cycle, a first address A1 is output on the bus from the CPU to the controller chip. Address A1 is the address of a first programmable register. In the second bus cycle, data D1 is output on the bus from the CPU to the controller chip. The controller chip stores data D1 from the bus into the programmable register for address A1.

A second data value is written to a second programmable register during the third and fourth bus cycles. Address A2 is output during the third bus cycle while data D2 is output during the fourth bus cycle. The controller chip writes data D2 to the register identified by address A2.

A third data value is written to another programmable register in the fifth and sixth bus cycles. Data D5 is written to the controller chip's register for address A5.

Each programmable register written requires a 2-bus-cycle access where the address is followed by the data. The programmable registers can be written in any order, but the correct address must precede the data value in each pair of bus cycles. Data may be read rather than written to the programmable registers by not asserting a write signal from the CPU.

Burst Access—FIGS. 4, 5

High-speed busses often support higher data bandwidth using a burst access. ring a burst-access cycle, the address input in the first bus cycle is followed by several data values input over several bus cycles. A predefined burst order is used to determine the addresses of the data values in the burst sequence.

FIG. 4 is a diagram of data being bursted into programmable registers. Burst decoder 33 receives a starting address A1 during a first bus cycle. Selector 34 routes the data to the A1 data register in programmable registers 20 having the starting address (A1) in the second bus cycle.

During the next 3 bus cycles, data values are received without addresses. The addresses of these three data values are implied by the burst rules. The burst rules define the address order during burst cycles. For purely sequential burst rules, the implied addresses of the next 3 data values are A1+1, A1+2, and A1+3. Often the burst addresses are interleaved so the addresses are somewhat mixed in order: A1+2, A1+1, then A1+3. The burst order is usually a fixed order defined by the architecture. Although a purely sequential burst is used as the example, other semi-sequential or interleaved burst orders may be substituted. The burst sequence is usually for sequential addresses (1,2,3,4), or semi-sequential addresses (1,3,2,4, or 1,4,2,3, or others) in some predefined sequence.

During the third bus cycle, burst decoder 33 causes selector 34 to route the second data value D2 to the next data register (A2) in programmable registers 20. Then in the fourth bus cycle, burst decoder 33 causes selector 34 to route the third data value D3 to the third data register (A3) in programmable registers 20. Finally, in the fifth bus cycle, burst decoder 33 causes selector 34 to route the fourth data value D4 to the fourth data register (A4) in programmable registers 20.

FIG. 5 is a timing diagram of a burst access of programmable registers. In the first bus cycle, address A1 is sent from the CPU to the controller chip. This is the starting address of the burst access, identify the first data register to be written. In the second bus cycle, data value D1 is sent to the controller chip and written into the A1 programmable register. Then in the third bus cycle, data value D2 is written to the A2 register. In the fourth bus cycle, data value D3 is written to the A3 register, while in the fifth bus cycle, data value D4 is written to the A4 register. The burst can stop after four data values are written, or continue with data value D5 being written to the A5 register.

Only the starting address A1 was written to the controller chip. The other addresses A2, A3, A4, A5 were not sent across the bus from the CPU to the controller chip. These addresses are implied by the burst rules.

Since only one address is sent for four or more data values, more of the bus bandwidth is used for data transfers than for address transfers. This improves the efficiency of the bus, allowing data to be written to the controller chip more quickly. Higher performance results.

The data values burst in must exactly follow the burst sequence defined by the burst rules. Data cannot be written out of order without stopping the burst and inputting a new address.

Non-Sequential Register Access Breaks Burst—FIGS. 6, 7

FIG. 6 shows that non-sequential programmable registers are sometimes accessed. Often programs or software drivers only need to update some of the programmable register while other programmable registers are not updated. In the example of FIG. 6, only registers A1, A2, A4, and A6 in programmable registers 20 need to be updated. Registers A3 and A5 do not need to be written.

Using a burst access would require that the intervening registers A3, A5 also be written. However, the current values of these registers might not be known, and thus additional read cycles are required to determine the current values to write back during a burst. Having to read these registers can negate the advantage of the burst, so standard cycles are commonly used. The address for each register is sent over the bus before each data value.

FIG. 7 is a timing diagram of writing to non-sequential programmable registers. Since registers A3, A5 are not being written, a burst access is not possible. Standard address-data cycles are used, and the data registers are programmed one at a time.

In the first and second bus cycles address A1 and data D1 are sent to the controller chip to program register A1 with data D1. A bus-idle period of 2 clock cycles follows. The bus-idle period is needed during bus mastering mode to allow time for bus recovery or arbitration. The previous device must stop driving the bus before the next device drives the bus to avoid bus conflicts.

Register A2 is programmed with data D2 in two more bus cycles, while register A4 is programmed with data D4 in another pair of bus cycles. Finally register A6 is programmed with data D6 in a last pair of bus cycles. A total of 8 bus cycles are needed. Also, bus-idle periods of about 2 clocks are needed between each pair of bus cycles. This increases the total time from 8 to 12 bus cycles.

If the four registers were the four in the sequential burst order, then only 5 bus cycles (8 PCI clocks) are needed. However, when the register are not in the exact sequential burst order, 8 or more bus cycles are needed.

While burst access is efficient, it is not always useful since registers are not always programmed in the sequential burst order. Sometimes only a relatively few registers are written. When even one register in the burst sequence is not written, then burst access may not be possible.

What is desired is burst access of programmable registers. It is desired to access programmable registers using burst access even when the registers being accessed are not in the burst-sequence order. It is desired to program only a subset of the registers in a burst sequence while still using efficient burst access cycles. A higher-speed method to access non-sequential programmable registers is desired.

SUMMARY OF THE INVENTION

A programmable controller has an address latch that receives an address from an address bus. It stores the address. A data-bus input is connected to a data bus. A decoder receives the address from the address latch and determines when the address matches a control address of a mapping control register.

A plurality of programmable registers store a configuration that controls operation of the programmable controller. Each data register in the plurality of programmable registers is normally accessed by a register address.

A mapping control register is coupled to the decoder and to the data bus. It stores a mapping control word when the decoder determines that the address matches the control address. The mapping control word indicates a group of the data registers in the plurality of programmable registers to be written in a single burst cycle.

A data selector is coupled to the data bus. It transmits data from the data bus to a selected data register in the plurality of programmable registers. The selected data register is one of the group of data registers identified by the mapping control word in the mapping control register.

A state machine is coupled to control signals for the bus. It signals the mapping control register to store the mapping control word during a first data bus cycle of the single burst cycle. It also signals the data selector to transmit successive data words from the data bus to successive data registers in the group of data registers identified by the mapping control word during additional data bus cycles of the single burst cycle. Thus the group of data registers identified by the mapping control word is programmed during the single burst cycle.

In further aspects, during the single burst cycle, register addresses for the data registers in the group of data registers are not sent over the address bus to the programmable controller. Instead, only the control address of the mapping control register is sent to the programmable controller over the address bus. The mapping control word sent over the data bus identifies which data registers are programmed during the single burst cycle.

In still further aspects of the invention, register addresses for the data registers in the group of data registers are separated by other register addresses for data registers not in the group of data registers. The other registers in the programmable controller are not being programmed by the single burst cycle. Thus non-sequential register addresses are programmed during the single burst cycle.

In still further aspects, the data registers include registers that determine a rate that the programmable controller generates a horizontal sync pulse and include registers that determine a rate the programmable controller generates a vertical sync pulse for a graphics display. Thus the programmable controller is a graphics controller.

DETAILED DESCRIPTION

The present invention relates to an improvement in burst access. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that the advantages of burst access can be applied to non-sequential programmable registers. When the starting address is for a special control register, a non-sequential burst is performed. The first data value sent in the burst sequence is a control word that the controller chip decoded to determine which registers to write. The controller chip then writes these registers with the remaining data values in the burst sequence.

The software driver usually knows in advance which registers are going to be programmed, so a list of these registers is generated by the software driver. This list is translated to bits set in the control word. Then the software driver uses a burst-write with the control word followed by the data values to written to the programmable registers. The starting address of the burst is the address of the control register in the controller chip.

Figure 8:
FIG. 8 is a timing diagram of a burst write to non-sequential programmable registers.

FIG. 8 is a timing diagram of a burst write to non-sequential programmable registers. During a first bus cycle, the CPU sends the starting address out on the bus. The starting address is the address of a special control register in the controller chip. In the second bus cycle, the bus-control chip set sends the control word. The control word appears to the computer system to be the first data value of the burst. However, the controller chip decodes this control word to generate a map of which registers to program during the burst.

In the third bus cycle, the CPU sends the data value D1. The controller chip routes the D1 data to the A1 data register, since the control word indicated that registers A1, A2, A4, and A6 will be programmed by the burst. The data value D2 is sent in the fourth bus cycle, and the controller chip writes the D2 data to the A2 register. In the fifth bus cycle, data value D4 is written to the A4 register, while during the sixth bus cycle, data value D6 is written to the A6 register in the controller chip.

Figure 1:
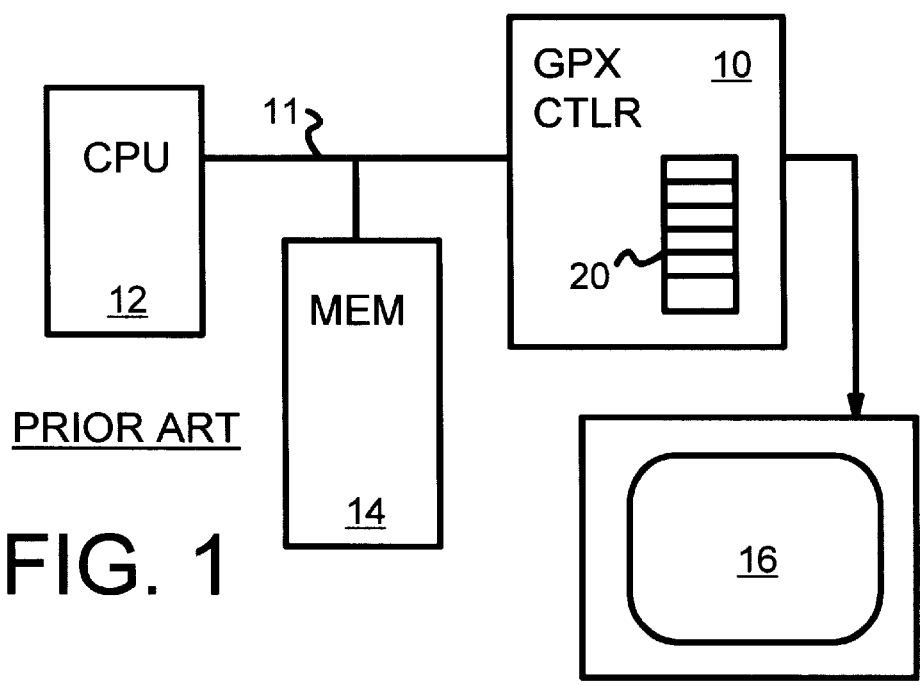
FIG. 1 shows a computer system with a controller chip having programmable registers.
Figure 2:
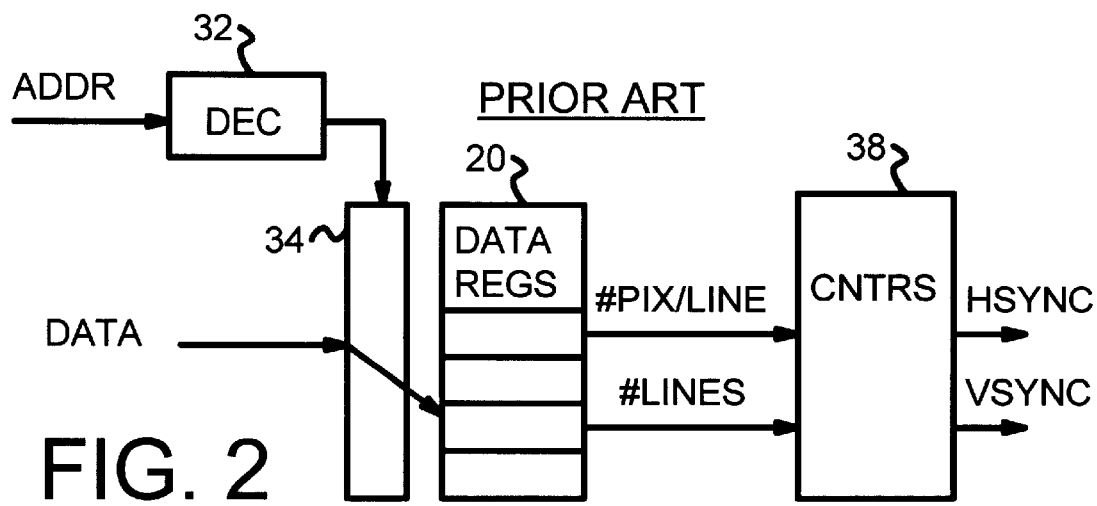
FIG. 2 highlights an address decoder that selects a data register for access.
Figure 3:
FIG. 3 shows standard bus cycles to program registers.
Figure 4:
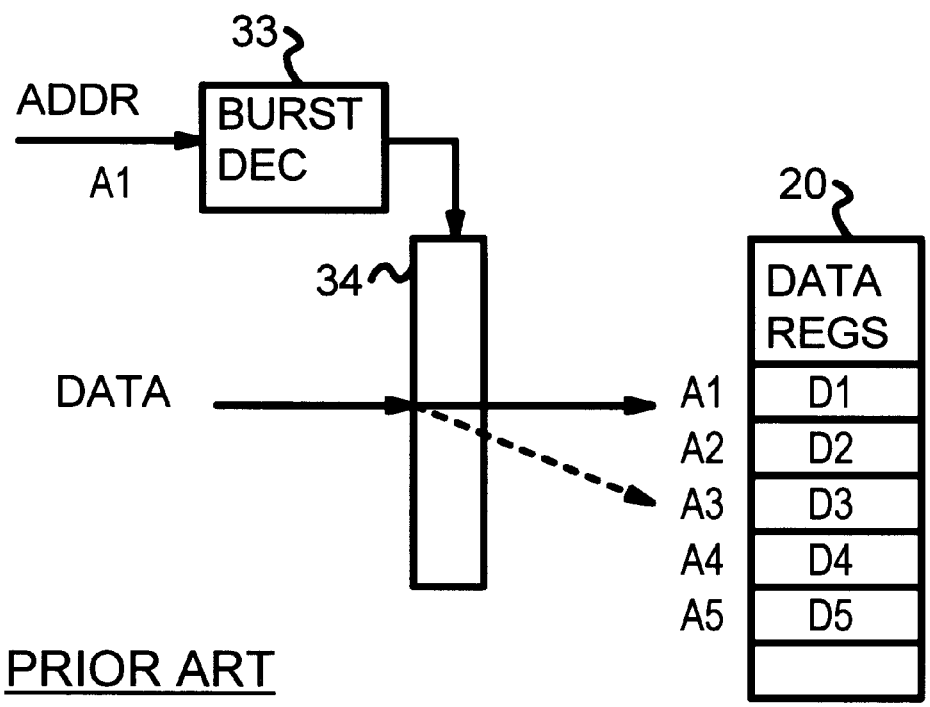
FIG. 4 is a diagram of data being bursted into programmable registers.
Figure 5:
FIG. 5 is a timing diagram of a burst access of programmable registers.
Figure 6:
FIG. 6 shows that non-sequential programmable registers are sometimes accessed.
Figure 7:
FIG. 7 is a timing diagram of writing to non-sequential programmable registers.

A total of 6 bus cycles are required for the non-sequential burst. In comparison with FIG. 7, which required 8 bus cycles, the bus usage is reduced by 25%. When bus-idle cycles must be added after each burst or standard access, then the non-sequential burst requires 7 bus cycles, including the idle cycle, while the standard random access requires 12 bus cycles. The bus usage is reduced by 42%.

Figure 9:
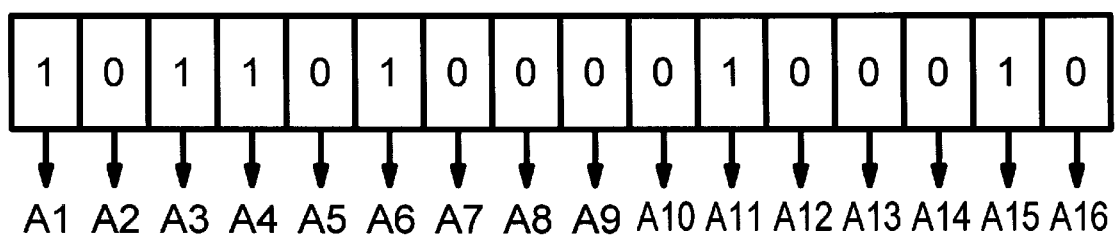
FIG. 9 is a diagram of a control word for mapping which of the programmable registers are to be written during a burst.

Mapping Control Word—FIG. 9

FIG. 9 is a diagram of a control word for mapping which of the programmable registers are to be written during a burst. A 16-bit control word is shown, but other sizes may be used.

Each bit in the control word is a flag that controls writing of one of the programmable registers. Thus a 16-bit control word can control up to 16 programmable registers. When a bit is set, the corresponding register is accessed. When the bit is cleared (zero), the corresponding register is skipped.

In the example of FIG. 9, registers A1, A3, A4, A6, A11, and A15 are programmed. The other registers A2, A5, A7–A10, A12–A14, and A16 are skipped and not accessed by the burst. Thus only 6 of the 16 registers are accessed when this example's control word is sent to the controller chip.

The registers are accessed in order. After the control word is sent, data values D1, D3, D4, D6, D11, D16 are sent in the next 6 bus cycles. These data values are written to programmable registers A1, A3, A4, A6, A11, and A15 by the controller chip.

Once the control-register address is sent during the first bus cycle, the addresses of the other data values in the burst are irrelevant. The registers accessed are determined solely by the data bits in the control word.

Figure 10:
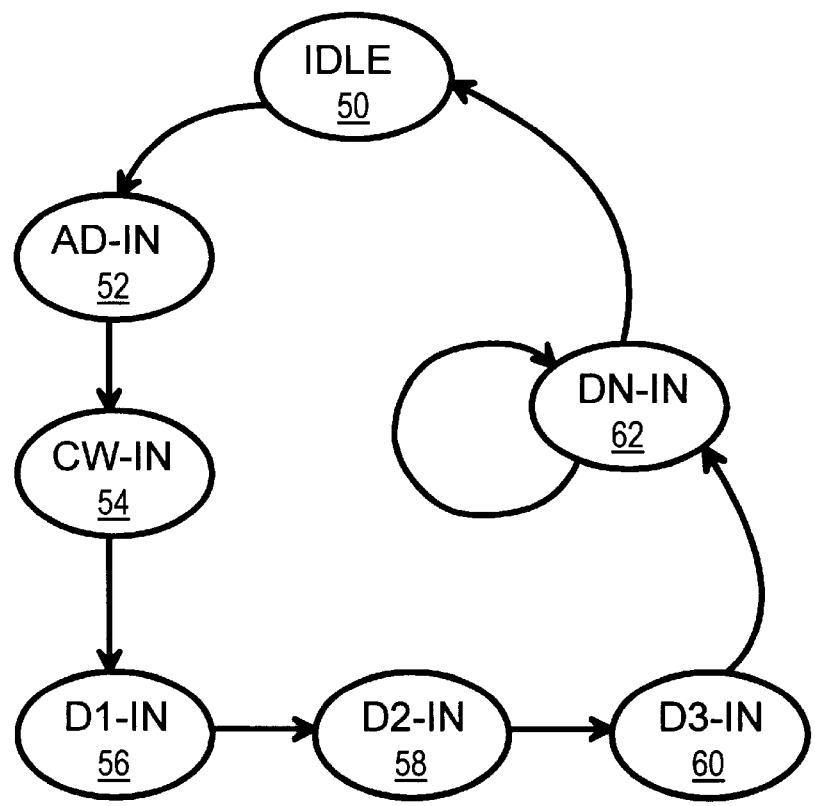
FIG. 10 is a state diagram for a state machine in the controller chip that accepts bursts to non-sequential programmable registers.

Controller State Machine—FIG. 10

FIG. 10 is a state diagram for a state machine in the controller chip that accepts bursts to non-sequential programmable registers. The state machine is advanced to the next state for each bus cycle. The controller chip resets the state machine into idle state 50. When a bus access begins, state 52 is entered. The address on the bus is latched into the controller chip and decoded. When this address is the address of the control register, state 54 is entered; otherwise the state machine is reset to idle state 50 or otherwise disabled for the remainder of the bus transaction.

In state 54, the control word is latched in from the bus. From the CPU's point of view, the control word is the first data value of the burst. The controller chip decodes the control word to determine which registers are to be programmed. The internal muxes are set to send the next data value to the first of these registers during the next bus cycle, state 56.

Data values are received from the bus and written to the programmable registers identified by the control word during states 56, 58, 60, and 62. Data for the first register identified by the control word is latched during state 56, the second during state 58, the third during state 60, and the fourth during state 62. When more than four registers are being programmed by the burst, state 62 is repeated as many times as necessary until all data from the burst is latched into the controller chip.

The controller chip is pipelined so that the data values can be quickly latched in from the bus. The data values latched in are sent to the programmable registers during the following bus cycle. Thus the actual writing of the programmable registers occurs one bus cycle later. The states 56, 58, 60, enter the first, second, and third data values designated as D1, D2, D3 in the Figure. However, these data values may be routed to any of the registers, not just the A1, A2, A3 registers. Thus they are not strictly D1, D2, D3, but could be D1, D4, D7, or other sequences. Once the last data value is latched in, idle state 50 is entered.

Figure 11:
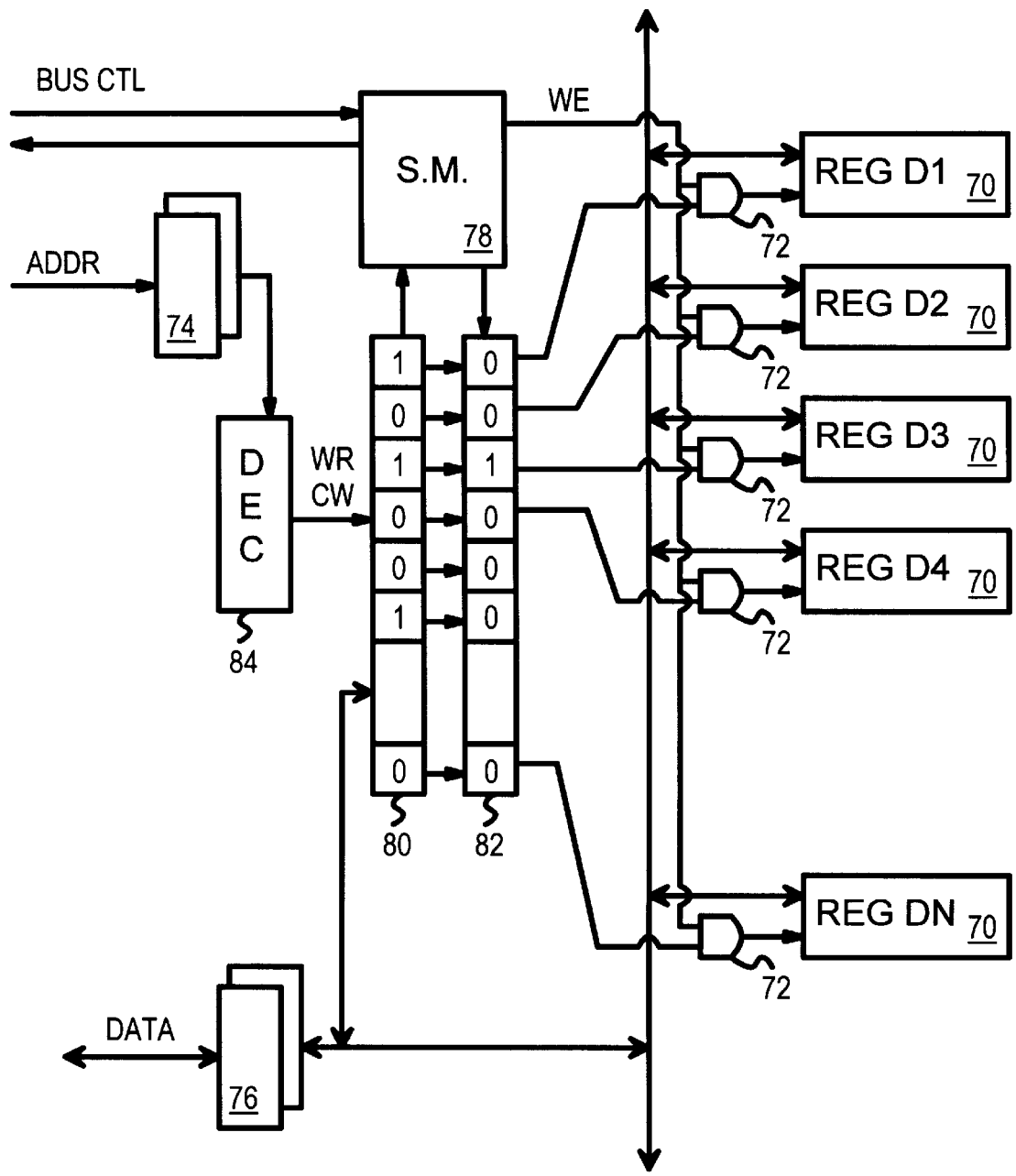
FIG. 11 is a diagram of a burst controller for non-sequential register access.

Burst Controller—FIG. 11

FIG. 11 is a diagram of a burst controller for non-sequential register access. The address is latched into address registers 74 during the first bus cycle. The first bus cycle may be indicated by an address-strobe signal from the CPU or a bus-controller system-logic chip set. State machine 78 may control address registers 74, or an address strobe may directly control address registers 74.

The address latched into address registers 74 is decoded by decoder 84 to determine if the address matches the address of the control register. When the address does not match, other address decoders (not shown) may be used with other write logic to write registers 70 when the address is for one of these registers.

When decoder 84 determines that the address latched into address register 74 matches the control-register address, a control-word-write signal is activated. Control register 80 is written with the first data value from data registers 76. This is the first data value of the burst received from the external data bus. As each new data value is received from the external data bus, it is also latched into data registers 76. Data registers 76 may be several clocks deep as need by the controller chip's pipeline.

State machine 78 reads the control word in control register 80 and counts the number of set bits. This is the number of registers programmed. The burst takes two more bus cycles than the number of registers programmed. State machine 78 receives and generates external-bus control signals such as ready, burst-ready, and strobe signals.

State machine 78 then sets one of the 16 bits in access register 82. The first bit set is for the first register to be programmed. The data value from data registers 76 is sent over an internal data bus to registers 70. Only one of registers 70 is enabled for writing by AND gates 72, since only one bit in access register 78 is set at any time. State machine is 78 generates write-enable signal WE to AND gates 72 that writes the data value from data registers 78 into the selected one of programmable registers 70.

During the next bus cycle, state machine 78 shifts the one bit in access register 82 to the position for the next register to be programmed. The write-enable is again generated and the next register written. The process of shifting the bit in access register 82 and writing the next data value from data registers 76 is repeated until all designated registers are written.

Rather than use access register 82, combinatorial logic may be substituted. A pass-gate 25 network can pass just one of the signals from control register 80 through to AND gates 72. Alternately, state machine 78 can generated the register-access signals directly.

ADVANTAGES OF THE INVENTION

Burst access of non-sequential programmable registers is accomplished using a mapping control word. Programmable registers are accessed using burst access even when the registers being accessed are not in the burst-sequence order. Only a subset of the registers in a burst sequence may be programmed while still using efficient burst-access cycles. A higher-speed method to access non-sequential programmable registers is achieved.

A total of 6 bus cycles are required for the non-sequential burst of FIG. 8. In comparison with prior-art FIG. 7, which required 11 bus cycles, the bus usage is reduced by 45%. When bus masters are used, bus-idle cycles must be added after each burst or standard access. Then the non-sequential burst requires 7 bus cycles, including the idle cycle, while the standard random access requires 12 bus cycles. The bus usage for bus master mode is reduced by 42%. Longer burst lengths improve the relative efficiency of the invention, since the control word overhead is spread over more data-transfer bus cycles.

ALTERNATE EMBODIMENTS

The inventor has contemplated several alternate embodiments. For example, several different control words may be used, each with a different starting address. The address and the data may be input on separate busses rather than a shared bus, or on shared or separate signal lines. The address may arrive slightly before the data but with some overlap. Then a separate bus cycle may not be needed to latch the address.

Different register and addressing sizes can be used. The smallest addressable unit may be a byte, but some systems may address only 16-bit, 32-bit, or 64-bit words as the smallest writeable unit. The control register may be 32 bits, while the data register also 32 bits. A 64-bit read can also be used to read two data registers in one bus cycle. Sixteen-bit programmable registers are also possible.

The control register does not have to be the same width as the data registers. For example, an 8-bit control register can be used with eight 16-bit data registers. A 32-bit control register can control 32 data registers, and those data registers can be any size.

Multiple control registers can be separately addressed, each controlling a different set of data registers. The encoding of the control word may be varied with multi-bit encodings that identify which of the programmable registers are to be written. The programmable registers could span several chips.

Many different I/O addresses can be used for the control and data registers. An indexing scheme may be used where the address is first written to an index or control register, then the data is written to a single data register and routed to the correct data register identified by the index. The mapping control word could point to nonconsecutive data registers that are normally accessed by a 2-step indexing scheme, thus bypassing the index. Color graphics chips use 3B4 (hex) for the index register and 3B5 for the data register. Often several sets of programmable registers are used. In addition to 3B4/3B5 for VGA programmable registers, the same graphics chip can use ports 3CE, 3CF for graphics-extension programmable registers. The invention may be applied in a highly-integrated chip, such as a graphics controller integrated together with a systems-logic controller.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A programmable controller comprising:

an address latch, receiving an address from an address bus, for storing the address;

a data-bus input connected to a data bus;

a decoder, receiving the address from the address latch, for determining when the address matches a control address of a mapping control register;

a plurality of programmable registers for storing a configuration that controls operation of the programmable controller, each data register in the plurality of programmable registers being normally accessed by a register address;

a mapping control register, coupled to the decoder and to the data bus, for storing a mapping control word when the decoder determines that the address matches the control address, the mapping control word for indicating a group of the data registers in the plurality of programmable registers to be written in a single burst cycle;

a data selector, coupled to the data bus, for transmitting data from the data bus to a selected data register in the plurality of programmable registers, the selected data register being one of the group of data registers identified by the mapping control word in the mapping control register; and a state machine, coupled to control signals for the bus, for signaling the mapping control register to store the mapping control word during a first data bus cycle of the single burst cycle, and for signaling the data selector to transmit successive data words from the data bus to successive data registers in the group of data registers identified by the mapping control word during additional data bus cycles of the single burst cycle, whereby the group of data registers identified by the mapping control word is programmed during the single burst cycle.

2. The programmable controller of claim 1 wherein during the single burst cycle, register addresses for the data registers in the group of data registers are not sent over the address bus to the programmable controller, wherein only the control address of the mapping control register is sent to the programmable controller over the address bus, wherein the mapping control word sent over the data bus identifies which data registers are programmed during the single burst cycle.

3. The programmable controller of claim 2 wherein register addresses for the data registers in the group of data registers are separated by other register addresses for data registers not in the group of data registers, the other registers in the programmable controller that are not being programmed by the single burst cycle, whereby non-sequential register addresses are programmed during the single burst cycle.

4. The programmable controller of claim 3 wherein the data registers include registers that determine a rate of the programmable controller generating a horizontal sync pulse and include registers that determine a rate of the programmable controller generating a vertical sync pulse for a graphics display, whereby the programmable controller is a graphics controller.

5. The programmable controller of claim 3 further comprising:

data latches, coupled to the data bus, for storing data to be written to the programmable register and for storing the mapping control word to be written to the mapping control register.

6. The programmable controller of claim 3 wherein the state machine further includes means for signaling the address latch to store the address during a first bus cycle of the single burst cycle.

7. The programmable controller of claim 6 wherein the state machine further comprises:

address state means for indicating an address-bus cycle when the address is received;

control-word state means, coupled to the address state means, for indicating when the mapping control word is received from the data bus during a first data-bus cycle;

first data state means, coupled to the control-word state means, for indicating when a first data word is received from the data bus during a second data-bus cycle, the data word for writing to a first data register identified by the mapping control word;

second data state means, coupled to the first data state means, for indicating when a second data word is received from the data bus during a third data-bus cycle, the second data word for writing to a second data register identified by the mapping control word;

third data state means, coupled to the second data state means, for indicating when a third data word is received from the data bus during a fourth data-bus cycle, the third data word for writing to a third data register identified by the mapping control word; and fourth data state means, coupled to the third data state means, for indicating when a fourth data word is received from the data bus during a fifth data-bus cycle, the fourth data word for writing to a fourth data register identified by the mapping control word;

the fourth data state means being reactivated for additional data-bus cycles to receive additional data words for writing to additional data registers in the group of data registers until all data registers identified by the mapping control word have been received from the data bus.

8. The programmable controller of claim 3 wherein the group of the data registers includes up to 16 data registers and wherein the mapping control word has at least 16 bits for controlling the up to 16 data registers.

9. A method for programming registers in a non-sequential order comprising:

sending a starting address to a controller chip that contains programmable registers;

when the starting address matches an address of a mapping control register in the controller chip:

sending a mapping control word to the controller chip over a data bus;

writing the mapping control word into the mapping control register;

decoding the mapping control word to determine which subset of the programmable registers to write during a current burst cycle;

sending a first data word over the data bus;

writing the first data word to a first register in the programmable registers;

sending a second data word over the data bus;

writing the second data word to a second register in the programmable registers;

sending a third data word over the data bus;

writing the third data word to a third register in the programmable registers; and signaling an end of the current burst cycle when a final data word is sent over the data bus;

wherein the first register is identified by a first address, the second register is identified by a second address, and the third register is identified by a third address;

wherein the first, second, and third addresses are not in a predefined burst sequence but are identified by the mapping control word, whereby programmable registers with addresses that are not in the predefined burst sequence are accessed in the current burst cycle.

10. The method of claim 9 wherein the first and second addresses are separated by other addresses for other registers in the programmable registers, whereby the programmable registers are programmed during the current burst cycle in a non-sequential order.

11. The method of claim 9 further comprising:

when the starting address does not match the address of the mapping control register in the controller chip:

performing a normal access cycle by sending one address for each programmable register accessed when the programmable registers are not in the predefined burst sequence; and performing a burst access cycle by sending one address for a group of programmable registers accessed when the group of programmable registers are in the predefined burst sequence, whereby the normal access cycle is performed by sending one address for each programmable register.

12. The method of claim 9 wherein signaling the end of the current burst cycle comprises the controller chip generating a ready signal.

13. The method of claim 9 further comprising:

determining which of the programmable registers to program during the current burst cycle;

setting bits in the mapping control word to indicate which of the programmable registers are in the subset to be programmed during the current burst cycle before the mapping control word is sent to the controller chip, whereby bits in th e mapping control word are set before being sent to the controller chip.

14. The method of claim 9 further comprising:

when a bus m aster sends the starting address to the controller chip:

adding a bus-idle cycle after the final data word is sent to the controller chip, whereby the bus-idle cycle is added after bus-master cycles.

15. The method of claim 9 wherein the final data word is at least a sixth data word, whereby the current burst cycle programs at least six of the programmable registers.

16. The method of claim 9 wherein each of the data words and the mapping control word are sent over the data bus during separate bus cycles during the current burst cycle.

17. The method of claim 9 wherein the starting address is sent to the controller chip over an address bus that is separate from the data bus.

18. A controller chip comprising:

programmable registers for controlling operation of the controller chip, each programmable register being identified by a register address;

a burst state machine, coupled to bus control signals, for sequencing through a burst cycle that includes an address bus cycle, a first data bus cycle, a second data bus cycle, a third data bus cycle, a fourth data bus cycle, and a fifth data bus cycle;

an address decoder that receives an address during the address bus cycle, the address decoder signaling a non-sequential burst when the address matches a control address;

a control register, coupled to a data bus, for storing a mapping control word received from the data bus during the first data bus cycle when the address decoder signaled the non-sequential burst;

a mapping decoder, coupled to the control register, for decoding the mapping control word to identify a first register, a second register, a third register, and a fourth register in the programmable registers; and data-routing means, coupled to the data bus and to the programmable registers and controlled by the state machine, for:

sending data received from the data bus during the second data bus cycle to the first register, sending data received from the data bus during the third data bus cycle to the second register, sending data received from the data bus during the fourth data bus cycle to the third register, sending data received from the data bus during the fifth data bus cycle to the fourth register;

wherein the first register, the second register, the third register, and the fourth register are not consecutive registers, wherein intervening registers in the programmable registers have register addresses between register addressed for the first register and the second register, whereby the programmable register that are non-consecutive are programmed during a single burst access having only the control address sent to the controller chip.

19. The controller chip of claim 18 wherein the address bus cycle does not overlap the first data bus cycle.

20. The controller chip of claim 18 wherein the mapping control word contains a series of bits, each set bit indicating a programmable register for access during the single burst access, each cleared bit indicating a programmable register to be skipped and not accessed during the single burst access.

* * * * *